United States Patent [19]

Guibert

[11] 4,089,322
[45] May 16, 1978

[54] FOOD PROCESSING TECHNIQUE

[76] Inventor: Raul Guibert, 8343 West 4th St., Los Angeles, Calif. 90048

[21] Appl. No.: 713,977

[22] Filed: Aug. 12, 1976

[30] Foreign Application Priority Data

Aug. 18, 1975  Argentina .............................. 259761

[51] Int. Cl.² .......................................... A47G 23/04
[52] U.S. Cl. .................................... 126/261; 99/355; 126/21 A; 165/107; 219/400; 312/236
[58] Field of Search ...................... 126/261, 268, 21 A, 126/390; 312/236, 223; 219/400; 186/1 R, 1 D; 99/355; 165/28, 107; 62/256; 206/508, 509, 511; 221/150 A

[56] References Cited

U.S. PATENT DOCUMENTS

| 1,173,720 | 2/1916 | Hughes | 186/1 R |
|---|---|---|---|
| 2,601,765 | 7/1952 | Turquette, Jr. et al. | 219/400 |
| 2,695,115 | 11/1954 | Roop | 206/508 X |
| 2,701,746 | 2/1955 | Piggott | 312/223 X |
| 2,855,762 | 10/1958 | Zehnder | 62/256 X |
| 3,306,068 | 2/1967 | Allgeyer et al. | 62/256 |
| 3,439,665 | 4/1969 | Stromquist | 126/21 A |
| 3,593,538 | 7/1971 | Bachman | 62/256 |
| 3,628,447 | 12/1971 | Levenback | 219/400 X |
| 3,696,630 | 10/1972 | Bressickello | 62/256 X |

FOREIGN PATENT DOCUMENTS 818,558  10/1951  Germany .............................. 126/390

Primary Examiner—William F. O'Dea
Assistant Examiner—Harold Joyce
Attorney, Agent, or Firm—Michael Ebert

[57] ABSTRACT

A fast food service technique in which a meal is pre-cooked and then transferred to a tray in which the food is refrigerated at a temperature just above its freezing point to preserve the meal without degrading its texture or flavor. When the food is to be made available to customers, the cold trays are transferred to the open shelves of a heating apparatus which is adapted to blow hot air into the shelves to heat the food in the trays to a temperature well below its boiling point to prevent re-cooking thereof and to form a curtain of heated air surrounding the shelves to effectively isolate the trays from relatively cool ambient air, whereby the heated trays may be directly withdrawn by a customer from a shelf without heat loss and without the need to open a door.

6 Claims, 7 Drawing Figures

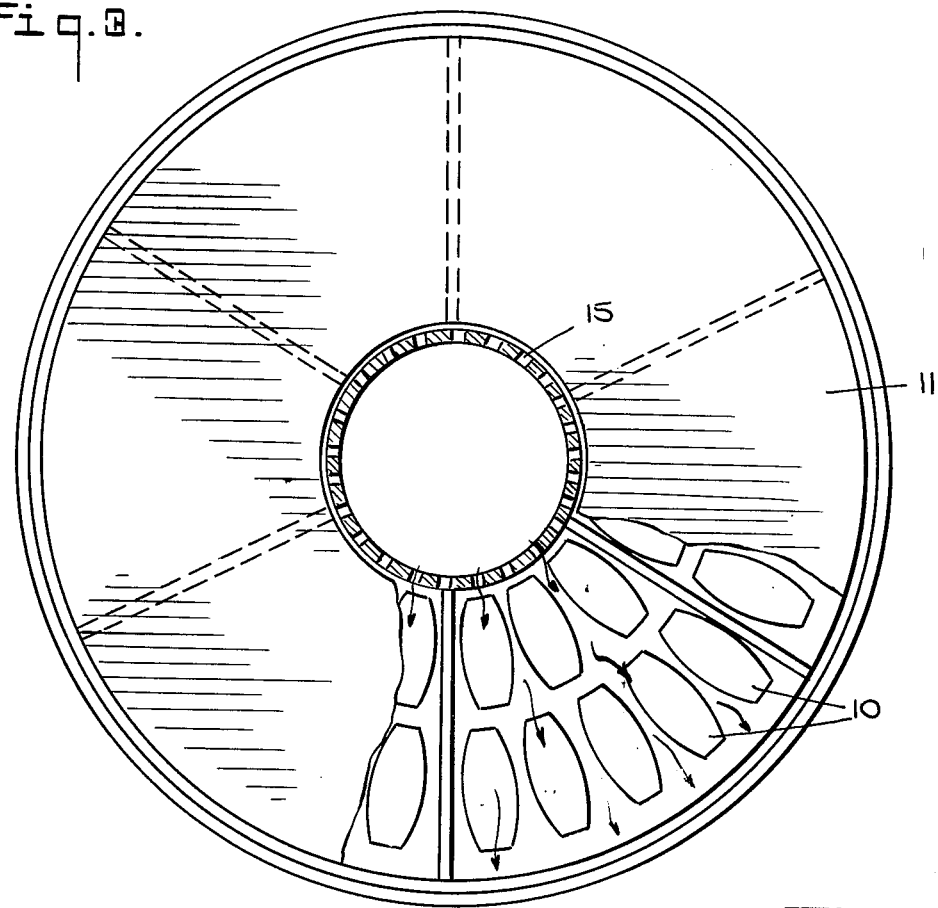
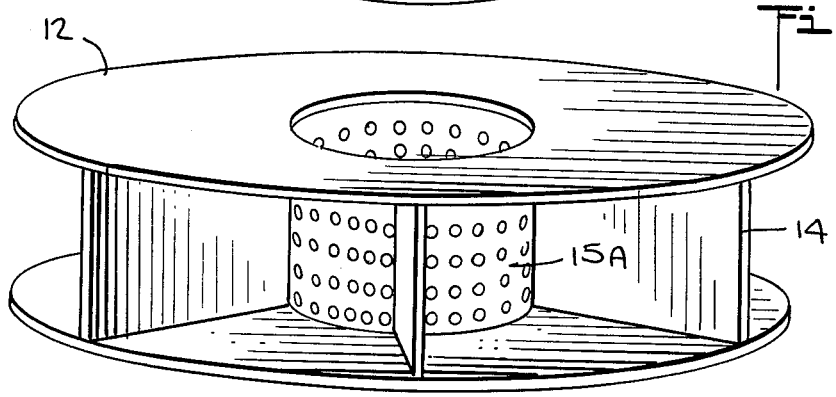
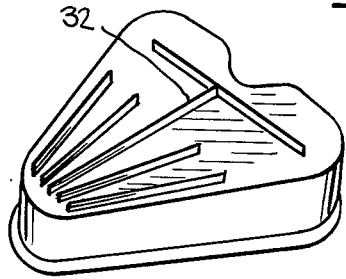
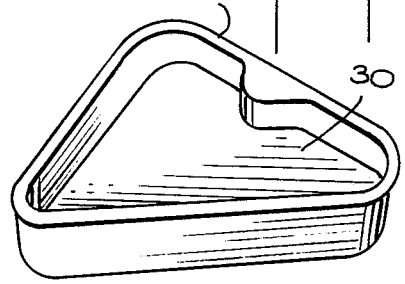

FOOD PROCESSING TECHNIQUE

BACKGROUND OF INVENTION

This invention relates generally to fast food service techniques, and more particularly to a technique wherein a meal is first cooked, then refrigerated and stored and subsequently reheated without degrading the basic texture, flavor and nutritional qualities of the meal.

The inflated cost of conventional restaurant service and the tendency of many Americans to eat on the run has brought about major changes in American eating habits. Thus, the typical American tourist with a family to feed can illafford to stop at a three-star road-side restaurant, for such restaurants are effectively reserved for those whose means are well above average and who can spare the time to have a meal freshly prepared, cooked and served by a waiter who must be tipped.

To meet the growing need for quickly-prepared, low-cost meals, fast-food operations have been developed in which the food to be served is deep freezed and stored, and when an order is placed for a particular item on the menu, the selected item is withdrawn from the freezer and cooked. In some cases, the frozen meal is pre-cooked so that it is only necessary to thaw and reheat the meal.

Though fast food techniques of the type heretofore known make possible relatively inexpensive meals and expedite service, the meals provided thereby are often unappetizing. The reason for this is that while freezing is effective in preserving food and in minimizing contamination, it often does so at the expense of the quality and flavor of the product. In the course of freezing, the moisture content of the food is converted into ice crystals which act destructively, for they rupture the internal structure of the food. As a consequence, frozen food has a characteristically tasteless and mushy quality.

Moreover, in reheating a pre-cooked frozen meal, it is difficult when going from the frozen state to an adequately heated condition to avoid a situation in which the core of the product is still cold even though the outer layer is quite hot. And when one seeks to ensure that the body of the food is hot throughout, there is a tendency to overheat the meal and thereby re-cook it, with a resultant loss of nutritional value and flavor.

Another factor which militates against the success of self-service fast food techniques is that the heated food is necessarily stored in a closed heat chamber which must be opened to obtain access to the product. In a mass feeding operation in which a large number of heated meals must be stored in readiness for withdrawal by customers, this involves a complicated multi-compartment structure, each with a separate door that must be opened to remove the meal and then closed.

SUMMARY OF INVENTION

In view of the foregoing, it is the main object of this invention to provide a fast food service technique and apparatus therefor whereby pre-cooked food which has been refrigerated may thereafter be reheated and made directly available to customers without degrading the essential texture, flavor or nutritional qualities of the meal.

More particularly, it is an object of this invention to provide a doorless heating apparatus for use in a technique in accordance with the invention wherein trays of pre-cooked food are stored in open shelves to which customers have direct access. A significant feature of the invention is that the trays may be withdrawn from the shelves without affecting the temperature prevailing within the equipment.

Also an object of the invention is to provide efficient, low-cost, open-shelf apparatus which may be used to heat or cool food-containing trays.

Briefly stated, in a fast food technique in accordance with the invention, fresh food is cooked and then transferred to individual trays, each providing a single meal. The trays are refrigerated to maintain the food therein at a temperature just above the freezing point, whereby the pre-cooked food is prevented from spoiling without, however, impairing the texture or flavor thereof. When the food is to be made available to customers, the cold trays are transferred to the open shelves of a heating apparatus which is adapted to blow hot air into the shelves to heat the food in the trays to a temperature well below the boiling point to prevent re-cooking thereof and to form a curtain of heated air surrounding the shelves to effectively isolate the trays from the relatively cool ambient air, whereby the heated tays may be directly withdrawn by a customer from a shelf without heat loss and without the need to open a door.

OUTLINE OF DRAWINGS

For a better understanding of the invention as well as other objects and further features thereof, reference is made to the following detailed description to be read in conjunction with the accompanying drawings, wherein:

FIG. 3 is a plan view of this shelf;

FIG. 4 is a modified form of shelf;

FIG. 5 shows one preferred form of tray as seen from the top;

FIG. 6 is a bottom view of the same tray; and

DESCRIPTION OF INVENTION

In a fast food service technique in accordance with the invention, the food to be served to customers is initially in fresh, uncooked condition. For purposes of illustration, we shall assume that the meal to be served is fish and chips and that the starting ingredients are, therefore, cut pieces of fresh fish and potato slices.

We shall further assume that one hundred meals of fish and chips are to be prepared, each meal to be served in an individual tray of sufficient size to accommodate a full meal. To this end, a sufficient amount of freshly cut fish and potato slices are cooked for one hundred meals. After cooking, the cooked products are divided to fill one hundred trays.

It is now necessary to refrigerate the trays to preserve the cooked meals until such time as they are to be served to customers which may be several days later. The trays are kept under refrigeration at a temperature just above their freezing point which, in practice, may be in a range of about 20° to 30° F. Thus where the moisture content of the food is rich in dissolved salts, the freezing point may be well below 32° F. It is important that the refrigeration, while close to freezing, not fall below the freezing point, for the formation of destructive ice crystals in the food must be avoided.

Then on occasions when the meals are to be dispensed to customers, the trays are taken from the refrigerator and loaded in the open shelves of a heating apparatus which is adapted to raise the temperature of the meals to a point sufficiently hot to inhibit decay but below the point at which the food would proceed to be recooked. Should some of the meals in the heating apparatus not be consumed in the course of a working period, the trays may be returned to the refrigerator and again cooled preparatory to the next demand therefor when they are again heated.

Inasmuch as the refrigeration is at a temperature just above the freezing point, it serves to preserve the food without affecting its quality, and since the subsequent heating of the refrigerated trays maintains the food at a temperature inhibiting spoilage but below the cooking temperature, the heating action is also not injurious. It is possible, therefore, to subject the trays containing precooked meals to more than one cycle of refrigeration and heating without adverse effects.

HEATING APPARATUS

Figure 1:
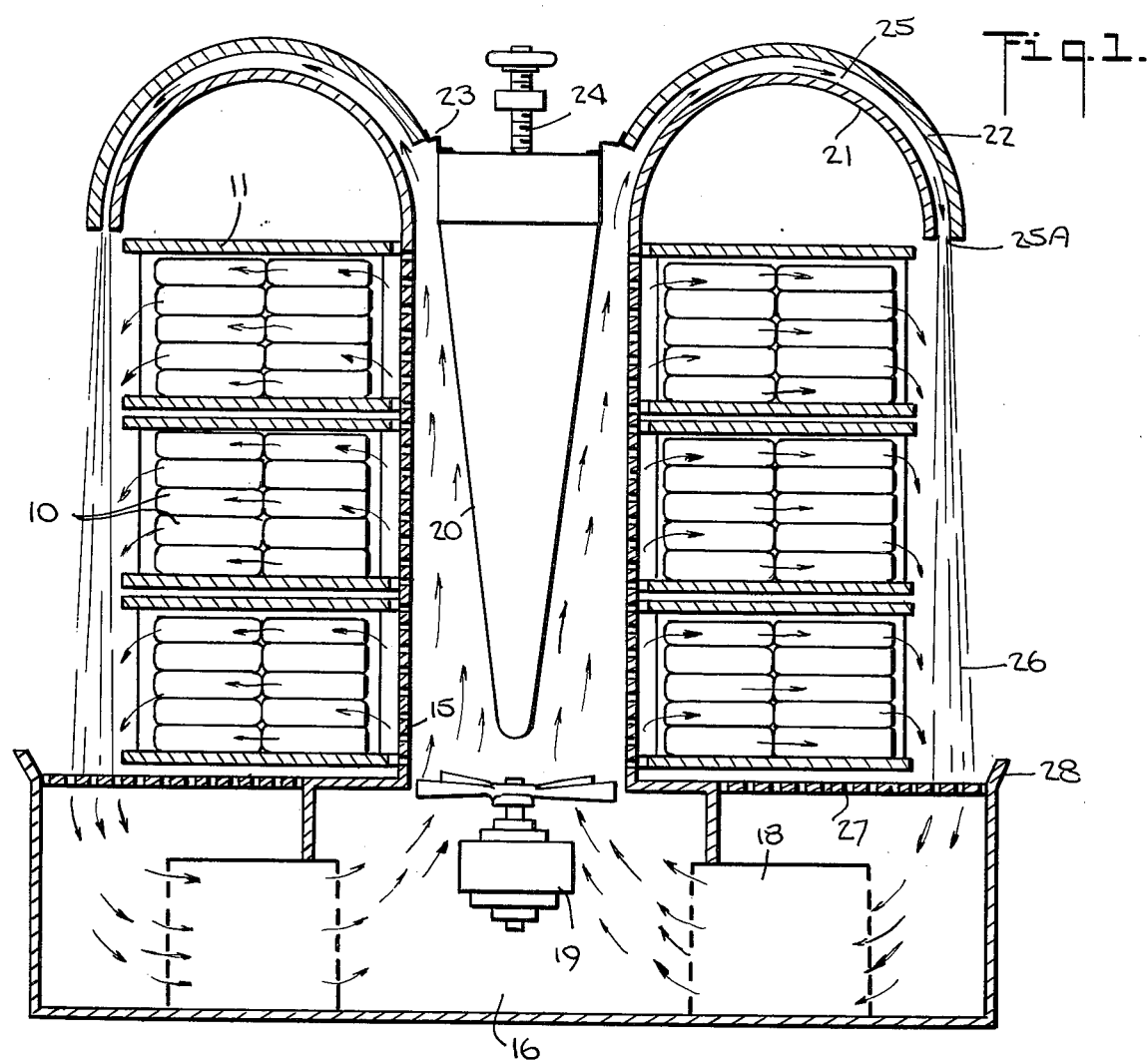
FIG. 1 is a front view of a vertical section of a heating apparatus in accordance with the invention.
Figure 2:
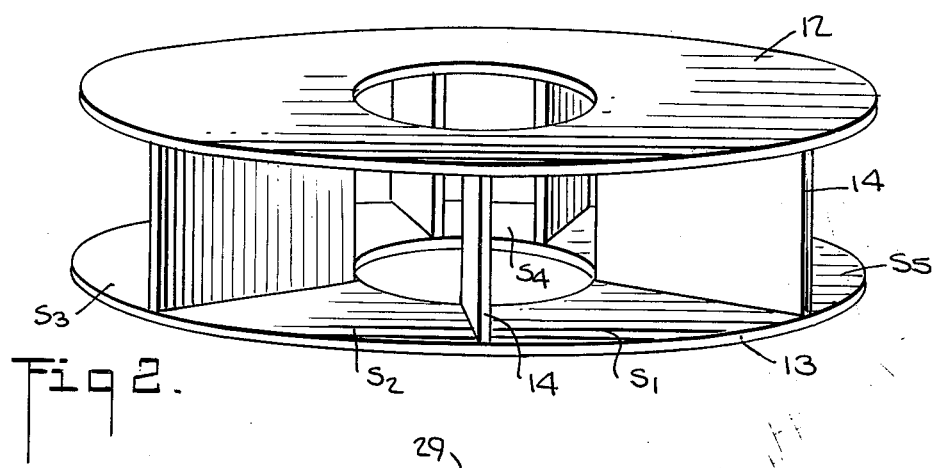
FIG. 2 is a perspective view of one shelf in the apparatus.

Referring now to FIGS. 1 to 3, there is shown the heating apparatus in accordance with the invention for heating a large number of individual trays 10, each containing a precooked meal. The trays before being loaded into the open shelves of the apparatus are refrigerated, and the apparatus is adapted to raise the temperature of the food to a level at which it normally would be served hot and to maintain the food at this temperature so that when a tray is withdrawn by a customer from a shelf, it is ready to be consumed.

Trays 10 are placed in open shelves generally designated by numeral 11, a vertical stack of three shelves being provided in the heating apparatus. As shown in FIG. 2, each shelf has a reel-like formation defined by a pair of discs 12 and 13 having a central opening, the discs being maintained in parallel relation by a radial array of five dividers 14. The upper and lower edges of the dividers are joined to the discs to create sector-shaped compartments $S_1$ to $S_5$ which accommodate the trays.

The three shelves are stacked one above the other on a foraminous hollow column 15 which extends through the central openings of the shelves. Column 15 is supported over a central well 16 of a drum-shaped heating chamber 17. Surrounding well 16 is an annular electrical heating element 18 adapted to heat air passing laterally therethrough, so that relatively cool air admitted at the periphery of the element emerges in heated condition at the inner periphery which banks the well. In practice, a lazy susan may be provided under each shelf so that the shelves may be independently rotated to facilitate loading of the unit by the operator and also to assist the selection of foods in self-service operation.

Air discharged from the inner periphery of heating element 18 into well 16 is propelled inwardly by a rotary fan 19 mounted just below the inlet to column 15. The heated air is forced through a converging annular passage defined by a conical deflector 20 coaxially supported within column 15. The upper end of deflector 20 which projects above the column has a cylindrical section 20A. Joined at its inner periphery to the upper end of column 15 is a hemi-torroidal minor dome 21, and mounted at the upper end of the cylindrical section 20A in spaced relation to the minor dome is a similarly-shaped major dome 22. The inner rim of the major dome is joined to cylindrical section 20 of the column by a flexible membrane 23 whereby the axial position of deflector 20 in column 15 may be adjusted by a lead screw 24.

The space between minor dome 21 and major dome 22 defines an umbrella-shaped flow passage 25 to direct air blown up column 15 outwardly from the upper end of the column to a downwardly-directed discharge outlet 25A to create a cylindrical air curtain 26 which surrounds the stack of shelves.

The downwardly-discharged air curatin is directed toward a planar grill 27 disposed at the upper end of heater chamber 17, the grill being encircled by a lip 28. The curtain of air admitted through the grill is returned to the input of heater 18 where it is reheated and again recirculated through column 15. The air flow pattern or circuit is therefore in the form of an endless loop in which the upwardly rising column of heated air is caused to flare outwardly and then rain downwardly until it reaches the heater chamber where the air is drawn through the heater before being returned to the column for recirculation.

Because deflector 20 is coaxially disposed within column 15, a portion of the air directed upwardly through column 15 is diverted, as shown in FIG. 3, and caused to go laterally through the apertures of column 9 into the shelves, this diverted air heating the food in trays 10.

The relative distribution of the portion of air which goes upwardly into dome passage 25 to form the exterior air curtain and the portion which passes laterally into the shelves to heat the food is determined by the size of the annular orifice 26 at the inlet to the dome passage. This orifice may be varied by raising deflector 20-the higher the deflector with respect to the column, the larger the orifice. The more restricted the orifice, the greater the amount of heated air that is diverted to heat the food on the shelves. In practice, heated air at 170° F is sufficient for heating the food in the trays.

Because of the air curtain, which in practice may have a velocity of about 1500 feet per minute, the heated food in the tray is effectively isolated from the relatively cool ambient air, even though the heating apparatus is open and accessible. The lateral velocity of air which heats the food in the trays has a lesser value (i.e., 300 feet per minute) to avoid disrupting the air curtain. In order to facilitate the circulation of air through the shelves, the trays are preferably formed with ridges to ensure spaces therebetween.

The trays in the shelves are accessible omnidirectionally, as shown in FIG. 3, and a customer may withdraw a tray from any compartment by extending his hand to pierce the hot air curtain. And because the high velocity air curtain is included in a closed circulating loop, very little heat exchange takes place between this curtain and ambient air.

While the heating apparatus shown in FIG. 1 has a foraminous column 15 which is distinct from the shelves, this column may, as shown in FIG. 4, be integrated into the shelves by installing a foraminous shell 15A within the central opening of each shelf. When the shelves are stacked one above the other, these shells will register with each other to effectively constitute the column.

TRAYS

Figure 7:
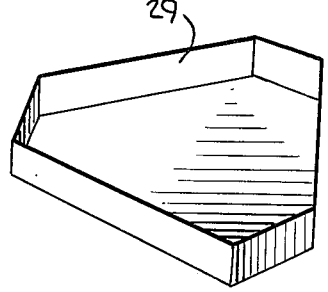
FIG. 7 shows another preferred form of tray.

Since the shelves are divided into sector-shaped compartments, it is desirable that the trays to be placed therein have a wedge-shaped formation accommodated to the geometry of the compartment. One such tray form is shown in FIG. 7, where it will be seen that tray 29 has a modified trapezoidal form. This tray is preferably formed of cardboard with a laminated aluminum foil inner lining. The tray is provided with a removable cover (not shown) of the same geometry. The tray and cover therefor may be formed from cardboard blanks.

FIGS. 5 and 6 show a tray 30 of molded plastic material having a heart shape, and an upper flange 31 to which the margin of a removable cover sheet may be sealed. The bottom of the tray, as shown in FIG. 6, is provided with a pattern of ridges 32, so that when these traps are stacked, air circulation spaces are provided between trays.

While there has been shown and described a preferred embodiment of food processing apparatus in accordance with the invention, it will be appreciated that many changes and modifications may be made therein without, however, departing from the essential spirit thereof. Thus while the apparatus has been shown as it operates to heat food contained in the shelves and to maintain the food at an elevated temperature, a similar apparatus may be used to cool or refrigerate food, in which case the heater in the heat chamber is replaced by refrigeration coils. And while an electrical heater has been disclosed, in practice, heat may be provided by heat exchange coils through which a heated fluid is circulated.

I claim:

1. Heating apparatus for heating food contained in trays having bottom spacers to provide air circulation spaces between the trays when they are vertically stacked, said apparatus comprising:
    A. means to support said trays in like vertical stacks thereof in an annular array surrounding a central hollow column whose outer boundary is provided with openings through which heated air may be forced to pass through said spaces between said trays to transfer heat to the food therein;
    B. heater means to provide heated air;
    C. means to blow the heated air at a relatively high velocity through said column; and
    D. a flow restriction at the outlet of the column having means including an orifice to receive the heated air blown therethrough and to conduct the heated air in a direction creating a heated air curtain surrounding the array of trays to isolate the trays from ambient air, said flow restriction producing an air pressure within said column causing a portion of the heated air therein to be injected through said openings with a force determined by the size of said orifice, thereby rapidly heating the food in said trays in the confined region between said boundary and said air curtain, the heated air in said curtain being returned to said heater means for recirculation through said column.

2. Apparatus as set forth in claim 1, wherein said heater means is disposed in a heater chamber to surround a central well above which the column is mounted, and said blower means is constituted by a rotary fan disposed in said well below the intake of the column to propel the heated air upwardly therein.

3. Apparatus as set forth in claim 1, wherein said means to support said trays in stacks is constituted by at least one open shelf of annular form to receive the trays and provided with a central opening through which said column extends.

4. Apparatus as set forth in claim 3, wherein said column is defined by a foraminous shell which is mounted within said central opening of the shelf to form a part thereof.

5. Apparatus as set forth in claim 1, wherein said flow restriction is constituted by major and minor hemitoroidal domes, one above the other, to define an umbrella-shaped flow restriction passage for directing the air from the column to a discharge opening.

6. Apparatus as set forth in claim 5, further including a deflector in said column to divert the heated air toward the openings and wherein the axial position of the deflector in said column is adjustable to vary the size of the orifice at the inlet of the flow restriction.

* * * * *